United States Patent Office 3,085,589
Patented Apr. 16, 1963

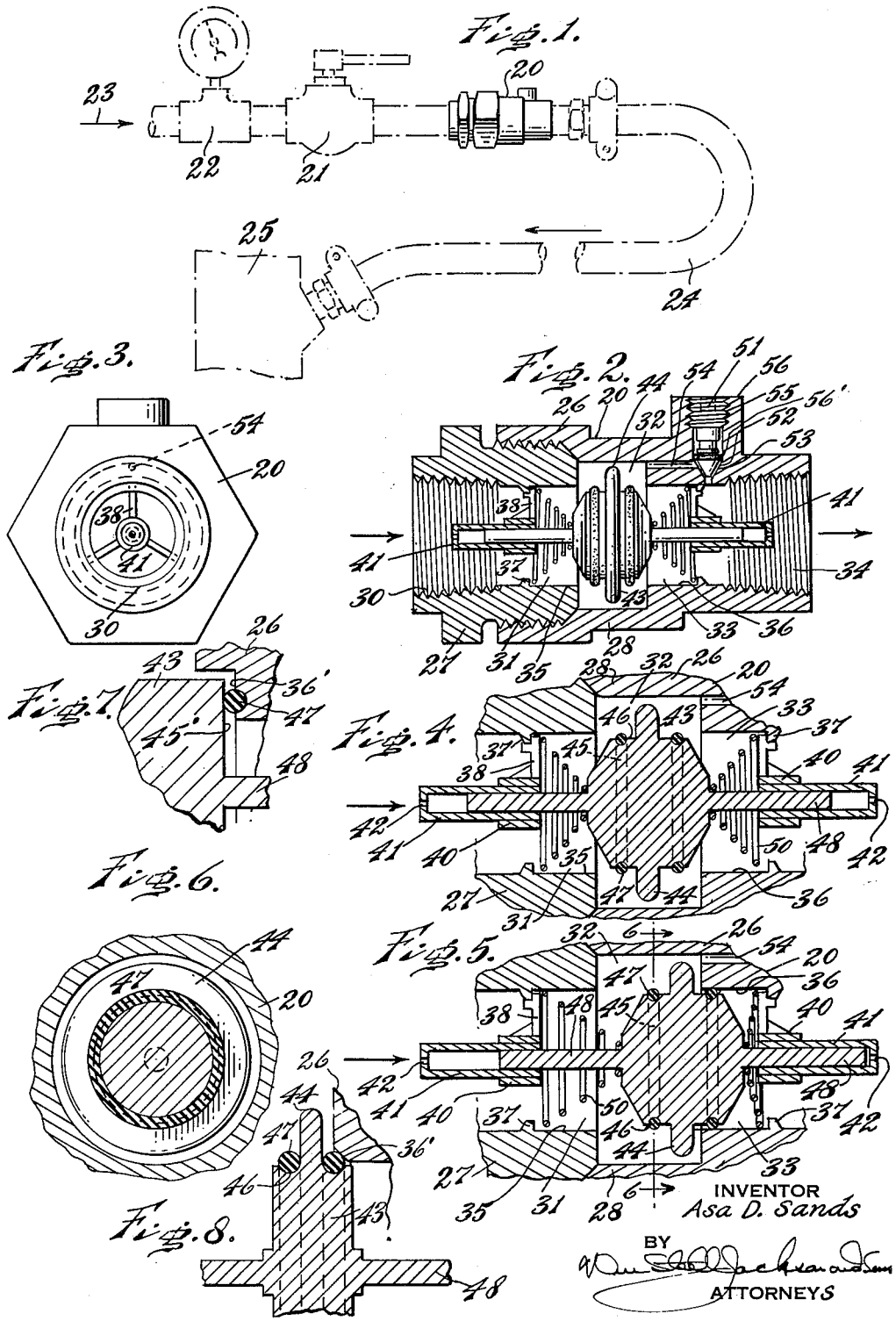

3,085,589
SAFETY VALVE
Asa D. Sands, 3606 Federal St., Camden, N.J.
Filed June 6, 1960, Ser. No. 34,045
4 Claims. (Cl. 137—498)

The present invention relates to valves, especially safety valves of the character which will prevent injury to personnel, damage to equipment and loss of fluids in case of accident.

A purpose of the invention is to prevent a safety valve from operating on a minor surge in the fluid.

A further purpose is to provide a dash pot acting on the valve stem to slow its response under minor fluctuations of pressure.

A further purpose is to more effectively seal the valve against the valve seat by use of an elastomer O-ring which is placed either on the valve or on the valve seat.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 1 is a side elevation of the valve of the invention assembled with equipment indicated in phantom.

FIGURE 2 is an axial section of the valve of the invention.

FIGURE 3 is an elevation of the valve of the invention from the inlet end.

FIGURE 4 is an enlarged fragmentary axial section of the valve of the invention in intermediate position.

FIGURE 5 is a view similar to FIGURE 4 with the valve seated at the outlet end.

FIGURE 6 is a section on the line 6—6 of FIGURE 5.

FIGURES 7 and 8 are fragmentary views similar to FIGURE 5 showing modified forms of valve and seat.

Describing in illustration but not in limitation and referring to the drawings:

In the prior art, safety valves have been extensively used to prevent injury to personnel and damage to equipment and loss of fluids on account of accidents.

One widespread use of such valves is in connection with compressed gas lines such as compressed air lines which are operating pneumatic riveters, chisels or other tools, particularly when men are on scaffoldings or in confined spaces as in shipbuilding and may be injured by the whipping of a hose incident to bursting of a hose.

Safety valves have also been used where delicate equipment at the outlet end may be injured by a sudden pressure surge of major proportions.

Use has also been made of safety valves in pipes and flexible lines which maintain desired electrical conditions, as where gas is employed in an electric cable.

An important use of safety valves is also in lines, whether flexible or piping, which contain very valuable or very dangerous oils, chemicals or other fluid materials, and it is desired either to prevent loss of the material or prevent injury to personnel or both in case a line fails.

One of the difficulties in the use of such safety valves in the prior art is that they have been inclined to be unduly sensitive, and respond to slight flutters or fluctuations in pressure which are not significant. Thus in the use of pneumatic devices in connection with bulldozers, it may be desirable to prevent the safety valve from closing on a momentary fluctuation due to operation of a valve, and still permit the safety valve to act if there is a major emergency which causes a violent pressure difference such as the bursting of a hose or a pipe.

By the present invention a simple retarding device is introduced into the safety valve, which permits slowing down its response especially on minor fluctuations in pressure.

Difficulty has also been encountered in the use of safety valves through the tendency of the safety valve to leak when it was seated and allow poisonous or valuable fluids to escape. With a view to preventing this difficulty, I provide a safety valve in which an elastomer O-ring accomplishes the seal.

In FIGURE 1 I illustrate a safety valve 20 according to the invention which is connected for example in an air pressure line which has a shut-off valve 21 and a supply pressure gauge 22 connected to a source of fluid pressure indicated by an arrow 23 and which at the other end connects through a hose 24 with the inlet of a pneumatic tool 25 where the pressure is utilized.

The valve has a housing 26 which is formed in two parts, consisting of a male threaded element 27 and a female threaded element 28 which are joined together to form a continuous through passage including a threaded inlet fitting 30, a seat passage 31 at the inlet end, a valve chamber 32, a seat passage 33 at the outlet end, and a threaded outlet fitting 34.

In the seat passage 31 at the inlet end there is a suitably annular valve seat 35 and in the seat passage 33 at the outlet end there is a suitably annular valve seat 36.

Each of the seat passages has an annular shoulder 37 which receives a suitably three-armed spider 38, which has a central hub 40 which receives and holds a tubular guiding cylinder 41.

The guiding cylinder is in effect a dash pot, and has at the end remote from the valve chamber a suitably fine bleed orifice 42.

A valve 43 has a central impeller disc 44 which clears from the surrounding annular valve chamber, but is sufficiently in the line of fluid flow so that it will influence valve motion if there is a sudden change in pressure at the two sides. The valve on either side of the impeller disc has a hub portion 45 which is adapted to extend into the adjoining valve seat chamber, when the valve is in position to seat.

In one embodiment of the invention, there is an annular recess 46 around the hub portion which receives an elastomer O-ring 47 which extends around the hub portion of the valve and protrudes sufficiently beyond the diameter of the valve seat so that when the valve reaches limiting position as in the position of FIGURE 5 the O-ring will make a tight seal against the seat.

Protruding from opposite ends of the valve are stems 48 of circular cross section in the direction of the axis which extend into and are guided and sealed with respect to dash pot cylinders 41.

Opposed conical helical compression springs 50 act between the spider on each side and the valve at the outer end of the hub portion, and in active position the valve is held open as shown in FIGURE 4.

In order to permit release of the valve so that it can open without being removed from the line, I illustrate a bypass valve 51 which has a cone surface 52 seating against a cone seat 53 in a bypass passage 54. The bypass valve is threaded at 55 in a boss 56 on the housing. The bypass valve seals to the passage in which it moves by an elastomer O-ring 56'.

In operation of the device of FIGURES 1 to 6, the safety valve is installed in a suitable line which may contain gas or liquid under pressure, with the bypass valve on the outlet end.

Under normal operating conditions the safety valve will remain open.

In order to fill the dash pots reliably with fluid and eliminate air if some other fluid than air is in the line, it will be best to accomplish several different violent changes in pressure first from one end and then the other until the dash pots properly fill with the fluid in the line and suck in or expel more such fluid as the valve moves back and forth.

The valve will not function until abnormal conditions develop. If the line breaks on the output side of the safety valve, causing a violent drop in pressure at the output side, the greatly accelerated flow will act on the valve and particularly on the impulse disc 44 to cause the valve to close as in FIGURE 5.

After normal operating conditions are restored, the opening of the valve can be accelerated by opening the bypass valve to allow equalization of fluid pressure on the two sides and then closing the bypass valve.

In some installations, an emergency such as a fire or explosion at the output end of the valve may cause a surge in the reverse direction, and in that case the safety valve may close on the input side, the reverse of FIGURE 5. While this type of emergency does happen, it is less common and it is shortly corrected in most cases by the development of excess pressure on the input side which will again open the valve, so that no bypass valve is needed in this case.

While I show in the form of FIGURES 1 to 6 the use of the elastomer O-ring, suitably of rubber or synthetic rubber, on the valve, I illustrate in FIGURE 7 a seat 36' in the form of an abutment which holds an elastomer O-ring 47 as by cement, and seats against a valve shoulder portion 45' formed by the valve hub.

The elastomer O-ring should preferably have sufficient softness so that it will yield under pressure of the valve, and a satisfactory durometer may be in the range of 30 to 70 for many installations.

While the construction of FIGURES 1 to 6 is suitable for liquid lines such as oil, water and chemical lines, for gas lines the operating pressure differentials are sometimes small and the force to unseat the valve of FIGURES 1 to 6 may be excessive. I prefer to have O-rings 47 on the valve seat against conical seats 36' at opposite ends as in FIGURE 8, in which case very little force is required to unseat the valve.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention what I claim as new and desire to secure by Letters Patent is:

1. In a safety valve construction, a housing having a valve passage therein and opposed valve seats along said passage, a valve in said valve passage and adapted to move in opposite directions and close against either one of said opposed valve seats, spring means biasing the valve toward an intermediate position between said seats, a central impeller disc radially positioned on said valve and spaced from the surface of said passage, stems extending in opposite directions from the valve, guide means for said stems to be guided in movement of said valve from said intermediate position to either of said opposed seats, said guide means including a cylinder cooperating with each of said stems to retard motion of said valve from said intermediate position of the valve to one of said seating positions and having an annular wall which constitutes one of said means for guiding the stems, and orifice means for restricting flow of fluid from said cylinder to said valve passage when said valve, under differential of fluid pressure applied to said impeller in said passage, moves against bias of said spring means from said intermediate position toward said one of said seating positions, and for fluid to restore in said cylinder when said valve moves from said one of said seating positions back toward said intermediate position under bias of said spring means.

2. A valve of claim 1, in which elastomer O-rings effect sealing between the valve and the seat in the closed positions.

3. A valve of claim 2, in which the elastomer rings are mounted on the seat.

4. A valve of claim 2, in which the elastomer O-rings are mounted annularly on the valve, and the valve seat in each case is a cylindrical surface having a diameter less than the outside diameter of the O-rings when the valve is in open position but greater than the outside diameter of the rest of the valve at the places on the valve immediately adjacent to the O-rings.

References Cited in the file of this patent

UNITED STATES PATENTS

| | | |
|---|---|---|
| 701,754 | Moran | June 3, 1902 |
| 1,466,171 | Jacobsen | Aug. 28, 1923 |
| 2,121,936 | Thomas | June 28, 1938 |
| 2,307,949 | Phillips | Jan. 12, 1943 |
| 2,445,505 | Ashton | July 20, 1948 |
| 2,454,480 | Rossman | Nov. 23, 1948 |
| 2,623,725 | Sands | Dec. 30, 1952 |
| 2,806,644 | Warren | Sept. 17, 1957 |
| 2,889,850 | Eberline | June 9, 1959 |